INVENTOR.
SAMUEL ROSE

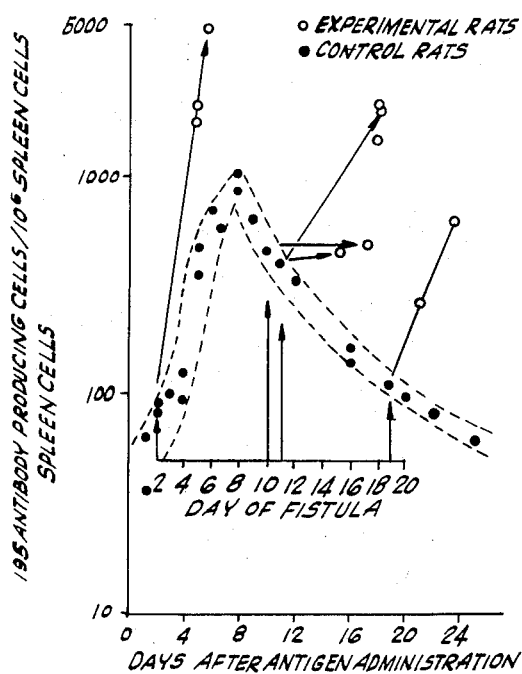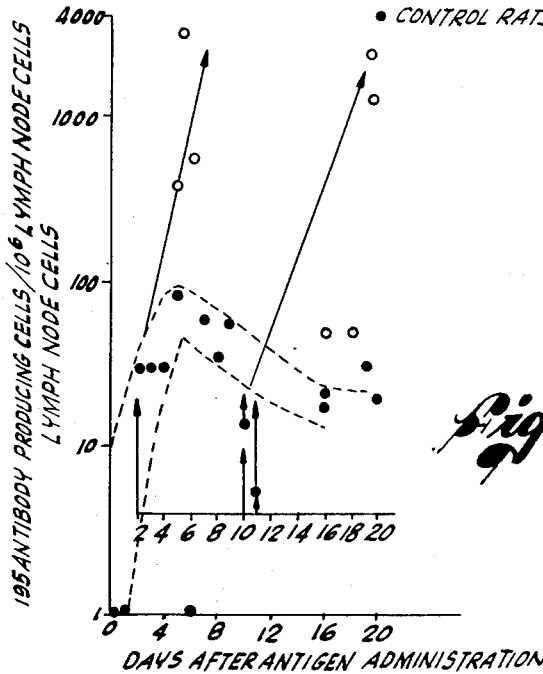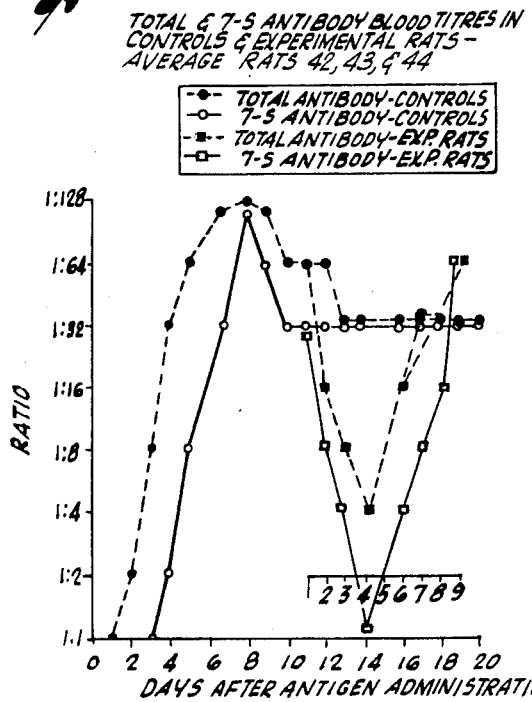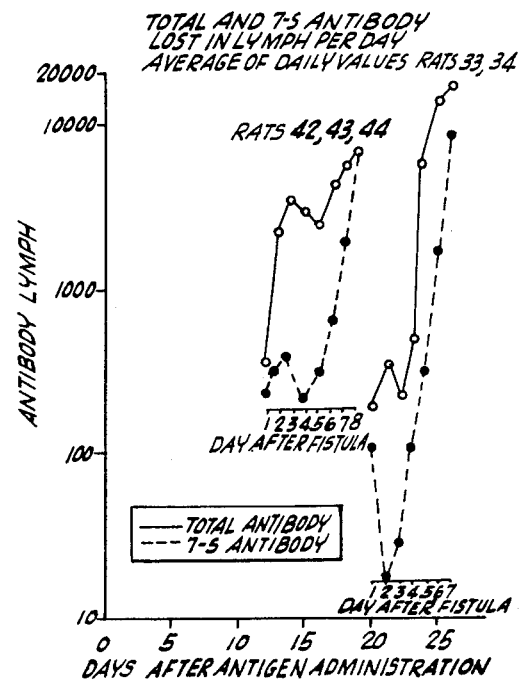

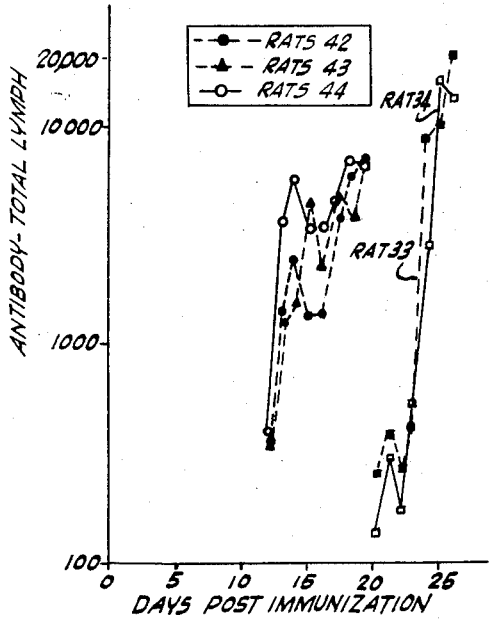
Fig.10 TOTAL ANTIBODY LOST IN LYMPH PER DAY-DAILY RESULTS
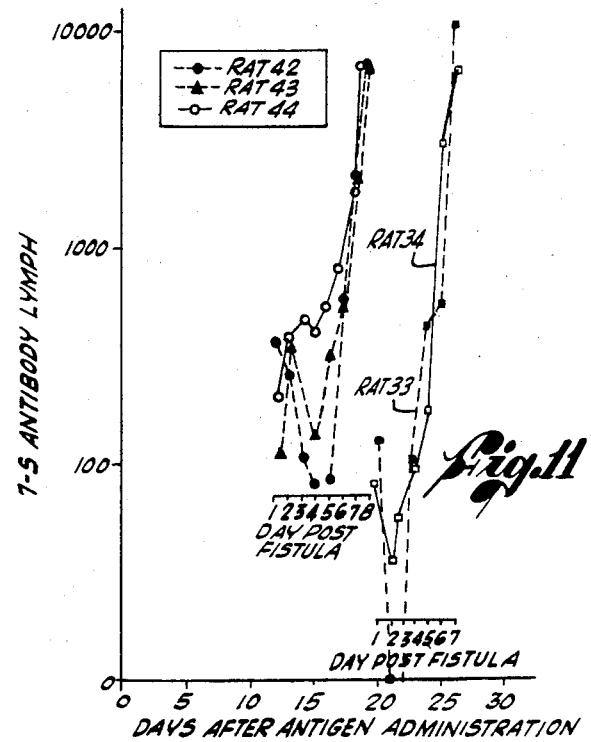
Fig.11
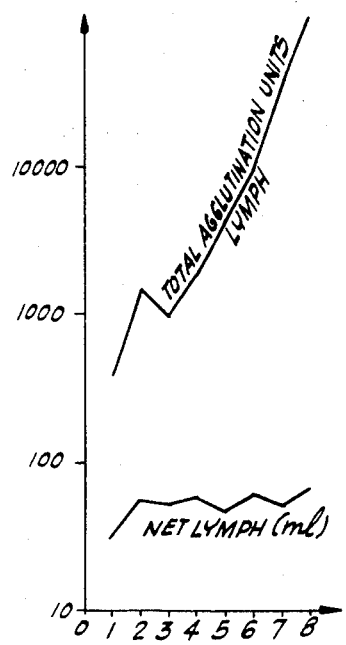
Fig.12
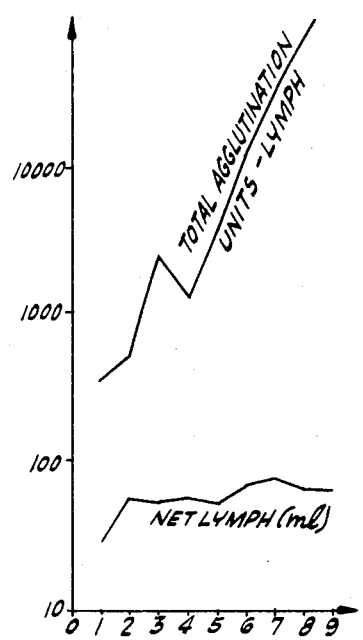
Fig.13
INVENTOR.
BY SAMUEL ROSE
ATTORNEY

United States Patent Office 3,719,182
Patented Mar. 6, 1973

3,719,182
AUGMENTATION OF THE PRODUCTION OF ANTIBODIES IN ANIMALS AND HUMANS AND THE COLLECTION THEREOF
Samuel Rose, La Jolla, Calif., assignor to
Bio-Response, Inc., New York, N.Y.
Filed Apr. 22, 1971, Ser. No. 136,476
Int. Cl. A61b *19/00*
U.S. Cl. 128—1 R                19 Claims

ABSTRACT OF THE DISCLOSURE

It has been found that very large production of antibodies can be achieved by removing specific feedback regulatory antibodies by means of a lymphoresis performed under special conditions in a patient or subject (e.g., an animal or human) with induced anatomical and physiological changes.

The subject is first given antigen administration then, preferably, but not mandatorily, is splenectomized. A thoracic duct fistula is next performed. The central venous system pressure is then preferably raised so that it is above the atmospheric pressure of the thoracic duct. In this manner, substantially all the lympth fluid is allowed to flow out of the thoracic duct from the fistula (through an indwelling catheter) for a prolonged period of time. The lymph is separated into cells and lymph fluid. The cells are returned to the subject intravenously. The subject must be given replacement fluid, which can be of several kinds, but all lacking the specific antibody.

By virtue of the above procedure, the plasma and extracellular fluid of the subject is continuously depleted of feedback antibody because the antibody is continuously removed prior to its reaching the blood stream. Because of this lack of antibody, in the presence of antigen administration, it is found that the antibody production in the lymphoid tissue and therefore its content in the lymph fluid is enormous and ever-increases. The tremendous increase in antibody production appears to be several orders of magnitude greater than other modes of antibody production and therefore appears to have very substantial utility in the fields of biology, chemistry and veterinary and clinical medicine.

BACKGROUND OF THE INVENTION

(a) Introduction

Antibodies are protein in nature and fall into the category of immuno-globulins. Most of the antibodies are found in gamma-globulin. Antibodies are synthesized by the lymphoid tissue of animals and man as the immunological response to challenges, that is foreign bodies, introduced into the animal or man. These challenges are called antigens. Antibodies react specifically with antigens in various ways to hasten elimination of antigens and reduce the possibility of infection.

The production and collection of antibodies from animals is, at present, a very costly procedure.

(b) Utility of antibodies

Antibodies have a wide variety of known uses. First, antibodies are used as prophylactic therapy for animals and humans who have been exposed (or who have been thought to be exposed or are in danger of being exposed) to various infections and other antigens. This type of therapy applies to normal individuals or animals and those with immunological deficiences induced by disease, congenital anamolies, iatrogenically induced or accidentally induced (e.g., through radiation overexposure, etc.) or other immunological deficiencies. The injection of antibodies is utilized as part of, or as a whole regimen of, the therapy of various infectious and disease states in animals and man and applies to individuals with normal and actual or potential immunological deficient states.

Antibodies are used as part or whole of the therapy to suppress the active development or expression of an immune state. For example, antibodies to Rh antigen are given to Rh-negative women to suppress their becoming actively immunized to Rh antigen thereby decreasing the chance of ill effect to their progeny. It is possible that antibodies could be utilized to prevent humans from rejecting organ and tissue transplants. Allogenically or heterogenically produced antibodies (intact or altered) should protect grafts or hosts from immunological damage. Antibodies (intact or altered) against tissue and other antigens can be used to prevent the development of autoimmune disease or to treat such autoimmune disease after it has been established.

Antibodies are used as specific immuno-chemical reagents to study, identify, localize, isolate, inactivate and measure the amount of various compounds (such as specific components of normal or altered plasma proteins, hormones, enzymes, normal and malignant tissue, and cellular antigens etc.). Thus, antibodies against transplantation antigens are used for tissue typing and labeled antibodies against tumor antigens could be used for detection and diagnosis of cancer.

(c) Prior art method for production of antibodies

Prior to the process of this invention the art of collecing antibodies from immunized animals or humans fell into two different categories. First, one could periodically remove whole blood and, secondly, one could periodically remove whole blood, separate the blood into cells and fluid and return the cells. In both cases only a small proportion, approximately one-quarter of the antibody contained in the blood stream and one-eighth of the antibody contained in the body, is removed.

These techniques for production of antibody are very costly because of the small proportion of antibody present in the body which is removed. It is known that plasmaphoresis, or periodic removal of whole blood and return of the cells of the subject (animal or human), causes increased antibody production in the host. However, because only a small proportion of antibody present in the blood is removed, the amount of increase in antibody production is limited until this loss is corrected. The procedure also has other substantial drawbacks. The procedure requires the handling of blood which has a high cellular content compared to lymph. The procedure can only be performed intermittently rather than continuously.

Also, the procedure for plasmaphoresis removes the antibody only after the antibody has exerted some of its feedback control and therefore the augmentation of the production of the antibody is not high.

In short, the removal of antibody by plasmaphoresis has limitations in that only a small proportion of the total antibody in the body is removed, the antibody cannot be removed continuously, is only removed after the antibody has had a chance to circulate in the bloodstream and after it has already exerted some feedback action. A high antibody production and collection is therefore not achieved.

Other procedures, such as the serial transfer of spleen cells from an immunized animal into non-immunized irradiated syngenic recipients and tissue culture procedures, demonstrate the magnification of the immune response in the absence of feedback antibody. These two procedures are not presently applicable to the production and collection of large amounts of antibody. Serial transfer of spleen cells shows that augmentation of antibody production can occur, but the antibody producing cells are distributed in all the recipients making the collection of the antibody difficult and inefficient. Present techniques of tissue culture of lymphoid tissue do not sustain prolonged antibody production in high amounts and therefore this technique is not yet applicable to the production and collection of large amounts of antibody.

The present invention is directed towards a process whereby tremendous production and collection of antibodies is provided by means of a continuous process which utilizes standardized or available apparatus.

(d) Rationale for the present invention

Antibodies are synthesized in the lymph nodes, spleen and other lymphoid masses of the body of the animal or human. The flow of antibodies from their sites of production to the venous circulation are shown diagrammatically in FIG. 1 under conditions of normal physiology and anatomy. Antibodies are secreted directly from the spleen 20 into the venous system 22, via venous channels 24, and without first flowing into the lymphatic vessels. Secondly, the antibodies leave the major lymphoid masses 26 by their efferent ducts 28. Data are available to support the lymphatic routes of antibody exit from the lymphoid tissues. The efferent ducts 28 from most but not all lymphoid masses join to make up the thoracic duct 30 which enters the major vein in the neck. Thirdly, the antibodies leave the minor lymphoid masses 32 via efferent lymph ducts 34. The efferent ducts 34 open via alternate lymphatico-venous channels 36 directly into the venous circulation system 22. The efferent ducts 34, from the minor lymphoid masses 32, also open via lymphatico-lymph anastomotic channels 40 directly into the thoracic duct 30, or into vessels which communicate with the thoracic duct.

Thus, it will be seen that, under conditions of normal physiology and anatomy, if a thoracic duct fistula is made, antibodies which are synthesized in the spleen and some lymphoid masses can reach the blood stream directly from the spleen 20 and from lymphoid masses 32 via channels 34 and 36.

Under natural conditions, antibody is eliminated either slowly, as by degradation, or quickly when the organism is invaded by antigens which complex the antibody. Under appropriate experimental conditions, antibody can be eliminated quickly by physical means. Apart from the influence of the presence of antigen-antibody complexes, the natural and experimental methods of eliminating antibody would be expected to have a similar quantitative and qualitative effect in augmenting the immune response. A moderate augmentation of the immune response and antibody production occurs if a small proportion of the total antibody in the body is removed by plasmaphoresis. However, unless a high proportion or all of the newly synthesized and augmented antibody production is removed prior to its reaching the bloodstream, a new state of equilibrium with relatively steady but increased antibody production and steady blood level of the antibody is established.

It is the rationale of the present invention that only by removing the newly synthesized and augmented antibody production as it is made, and prior to its reaching the bloodstream, can a *continuing out-of-equilibrium* state, with respect to antibody, be established. This continuing out-of-equilibrium state will result in a prolonged low blood titre and a continuing increase in antibody production. Since the out-of-equilibrium state is the cause for the increasing antibody production and results from the induced antibody loss, such circumstances lead to a very large production of antibodies, which can be collected from the subject rather readily.

To take the rationate further, if the central venous pressure is raised and the thoracic duct is converted into a fistula so that the pressure in the thoracic duct is low, a differential pressure between the thoracic duct and veins is established. Under these circumstances, all production of lymph flows into the thoracic duct fistula. Now, if further a splenectomy is caused so that no antibodies can flow directly from the spleen into the bloodstream, then virtually all production of lymph (and with it, all production of antibodies) flows into the thoracic duct fistula, and does not enter the bloodstream at all.

If then the lymph fluid is not returned to the subject, it is found that increasing production of antibodies many, many times that of usual antibody production is produced in the lymphoid masses and flows out through the fistula in the thoracic duct, and is collected therefrom.

A similar phenomena will occur if the lymph fluid after removal of antibody is sent directly back to the blood stream of the subject.

The foregoing rationale is the basis for the present invention and can be summarized in the following manner.

SUMMARY OF THE INVENTION

The present invention relates to a process for the continuous prolonged fluid lymphoresis from an immunized animal or human. The lymph is separated into cells and lymph fluid. The cells are returned intravascularly together with replacement fluid which can be of several kinds but all lacking specific antibody, e.g., plasma or serum from non-immunized animals, or lymph (from the same animal) from which specific antibody or gamma-globulin has been removed.

The lymphoresis is normally carried out in the animal or human with certain induced anatomical and physiological changes and utilizes available or standardized apparatus. The process results in an increased production of antibody, in the human or animal, which increased production rises as the process continues.

The lymphoresis procedure consists of establishing a thoracic duct fistula, preferably under conditions such that the lymph fluid is caused to flow only in the thoracic duct, and after collecting the lymph fluid, processing it in such a manner as to separate the lymph cells from the lymph fluid. The lymph cells are then returned intravenously to the subject and the cell-free lymph fluid is collected and either (1) not returned to the subject or (2) may be processed on-stream to extract from it, the specific antibody or gamma-globulin in which case, the anti-body free or gamma-globulin free lymph fluid is preferably returned to the bloodstream of the subject.

The animal or human's health is maintained by appropriate replacement therapy of serum, proteins, hormones, etc.

The body of the animal or human is thus depleted of feedback antibody and responds by producing antibody in enormous quantities since the immunological system of the animal or human senses that it is lacking in the antibody that its nature has come to demand in the presence of antigen. In this fashion, antibody is produced in tremendous quantities from very few animals and, in turn, can be collected at a very, very small fraction of the cost of present day methods now employed.

DESCRIPTION OF THE FIGURES

FIGS. 6 through 14 illustrate, graphically the augmented production of antibody resulting from the various embodiments of the present invention.

DETAILED DESCRIPTION OF THE PREFERRED EMBODIMENT

The following description relates to the presently preferred embodiment of my process wherein maximization of the immune response (i.e., antibody production) occurs. Maximum augmentation requires (a) antigen administration prior to and during fistula procedure; (b) splenectomy of the subject prior to fistula; (c) raised central venous pressure during fistula; (d) thoracic duct fistula procedure; and (e) separation of cells and lymph fluid with return of cells without lymph fluid followed by the separation of antibodies or gamma-globulin from the lymph fluid and return of the lymph fluid (minus the antibodies or gamma-globulin) to the subject in a continuous manner, or alternatively to this procedure, wasting the lymph fluid (with respect to the subject) and providing adequate replacement therapy to the subject. Anibodies are then collected from the wasted lymph fluid.

However, it is to be understood that many variations in the above procedure are possible which, while they do not result in maximization of the immune response, do result in greatly increased production of antibody from the subject. Thus, antigen administration to a subject over several weeks followed by lymphoresis through a thoracic duct fistula (but without splenectomy and raised central venous pressure), removal of antibodies from the lymph fluid, and the return of the antibody-free lymph fluid to the subject (or in the alternative, wasting of the lymph fluid but providing adequate replacement therapy) has also been found to result in highly augmented antibody production.

Specific examples of these variations will be described at a later point in this application.

Figure 1:
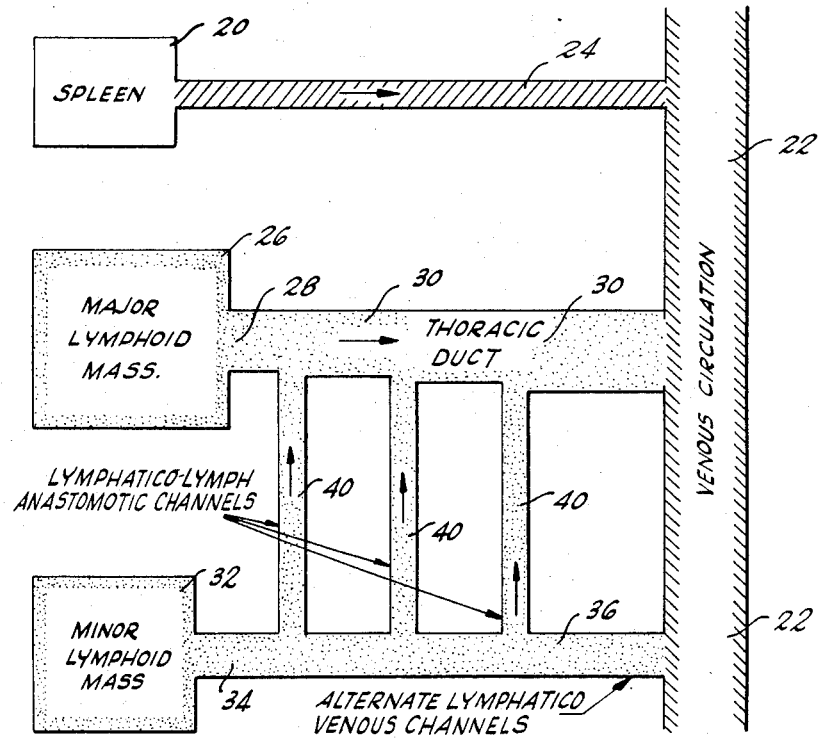
FIG. 1 is a diagrammatic view of the sources of antibody production, namely spleen and lymphoid masses, and of the normal flow of the antibodies from the source to the venous system of the animal or human.
Figure 2:
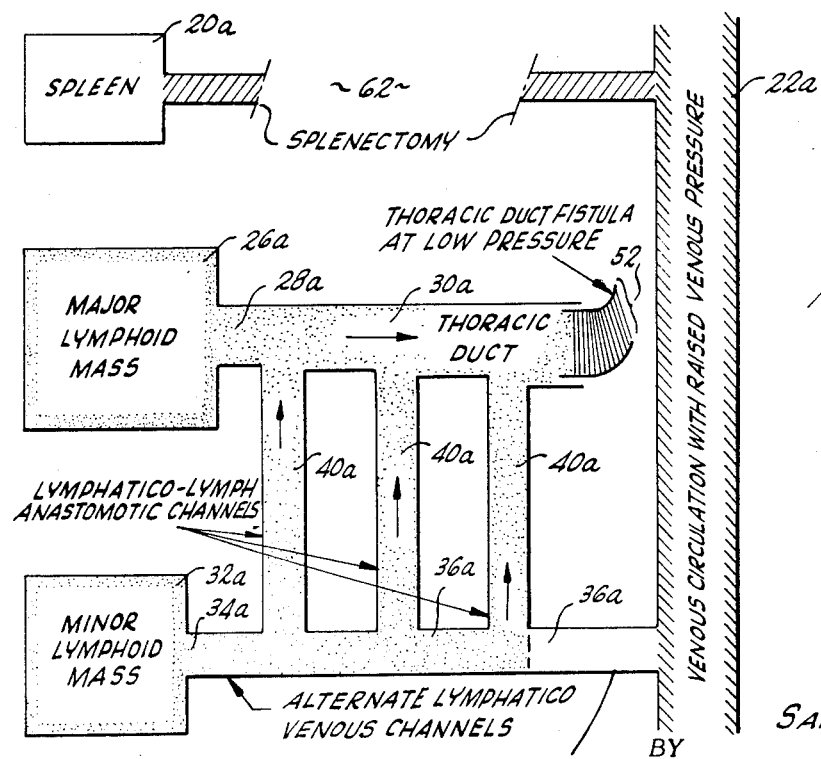
FIG. 2 is a diagrammatic view of the same system which has been surgically and medically altered in accordance with the purpose of the invention.

Turning now to the procedure illustrated diagrammatically in FIG. 2, the anatomy of the lymph system is modified so that the thoracic duct becomes the only lymph channel. This is optimally achieved by a two-stage operative procedure before thioracic duct fistula and before or after antigen administration or during the fistula procedure by appropriated quantities of albumin or serum infusions, or dextran or other osmotically active materials.

Referring specifically to FIG. 2, the central venous pressure of the patient or subject (whether it be animal or human) is elevated to between about 12 to 25 centimeters of water pressure by surgical procedures or by the intravenous administration of albumin and/or certain other replacement therapy chemicals, such as the intravenous administration of salt solutions, serum or plasma or dextran. Such administration is shown schematically in line 50a of FIG. 3, line 81 in FIG. 4 and line 102 in FIG. 5. The amount of administration of the replacement therapy medicaments and/or albumin or serum or dextran is controlled by the desired venous pressure. The venous pressure may be measured continuously by electronic means. If it is below a critical and chosen value, the subject receives a measured quantity of additional therapy medicaments and/or albumin or serum or dextran during the subsequent time period.

Additionally, the venous pressure may be increased by a controlled increased resistance of the venous returned to the heart. If this is found to be required the azygous veins are tied and remote controlled cuffs are placed around the superior vena cava (SVC) and inferior vena cava (IVC). After the subject has recovered from the operation (approximately three days to one week) the constriction will be applied to the IVC so as to increase the venous pressure to approximately 15 to 25 centimeters of water pressure.

A fistula is then made in the thoracic duct 30a, as shown at zone 52 in FIG. 2, and an indwelling cannula (not shown) is inserted into the fistula. The technique for the thoracic duct fistula has been established in rats, rabbits, sheep, calves, man and other animals and may require the use of a special double lumen catheter. Heparin, or other blood anticoagulant, is infused up one lumen to prevent clotting and to assure free flow of lymph from the fistula 52.

To this point, it will be seen that, because of the differential venous lymphatic hydrostatic pressure the major lymph flow from both major and minor lymphoid masses 26a and 32a, will occur, via efferent lymph channels 28a, 34a, through the lymphatico-lymph anastomic channels 40a, thence through the thoracic duct 30a and finally flow through the thoracic duct fistula 52 rather than through the multiplicity of alternate lymphatico-venous channels 36a. However, because antibody flow also occurs from the spleen 20a directly to the venous circulation system 22a, by-passing the toracic duct 30a, for optimal results, and in order to prevent antibodies from reaching the venous system and hindering the augmentation of the antibody production system, the lymph flow from the spleen 20a to the venous system 22a is preferably also eliminated by a splenectomy, as shown diagrammatically at zone 62.

Splenectomy is the procedure for surgically removing the spleen. This is achieved by an abdominal operation—ligating and cutting the splenic artery(ies) and vein(s) and then removing the spleen. The splenectomy operation is not necessary for the increased production of antibody, by virtue of the process of this invention, but is preferred for optimal augmentation of antibody generation and immune response.

The venous pressure can be elevated by the infusion of appropriate amounts of albumin or serum or dextran or other osmotically active materials. The venous pressure can also be elevated surgically by methods which increase the resistance of the venous return to the heart. If the venous pressure is elevated surgically it is preferable that it be achieved by a two-stage procedure. The first procedure is carried out prior to the fistula and consists of ligation of the azygous veins and partial occlusion of the inferior vena cava. The second procedure is the fistula and partial occlusion of the superior vena cava.

The thoracic duct 30a becomes enlarged because of the increased venous pressure and enables a larger cannula to be inserted in the thoracic duct than would otherwise be possible. (The cannula is inserted into the thoracic duct after the thoracic duct has enlarged and reaches a plateau.) The increased venous pressure also prevents collateral lymphatico-venous channels from developing during the fistula procedure and insures continuous lymph flow through the thoracic duct. The increased venous pressure also closes or reverses flow in the normal and already established lymphatico-venous channels and enlarges established lymphatico-lymph anastomic channels 40a.

The thoracic duct 30a is thus assured of being the primary lymph channel and the fistula 52 performed will thereby allow the maximum elimination of newly synthesized antibody through this primary lymph channel.

Despite the foregoing procedures, it is possible that some newly formed antibody will enter and circulate in the bloodstream, especially when a splenectomy is not performed. Nonetheless, a very significant proportion of such antibody will be lost through the thoracic duct fistula 52.

In order that the process of this invention result in greatly increased augmentation of antibody production and insure the health of the subject, the cells contained in the lymph are required to be returned intravenously in a viable and undamaged condition. This may be achieved by a batch technique or by a continuously centrifugal cell separator device, set forth in FIGS. 3 and 4, and designated by numeral 70, and in FIG. 5 designated by numeral 108.

The lymph passes from the thoracic duct fistula 52 directly to the centrifuge separator 70 (or 108) one type of which separator has been described and patented in Australian Pat. No. 31,178/67 of Kerby. The lymph fluid passing into the cell separator 70 (or 108) shown in the above-identified Australian patent comes into contact with surfaces within the cell separator, which do not denature or alter the protein and other macromolecules within the lymph fluid. Furthermore, frothing or foaming of the lymph fluid is avoided in order to minimize conditions which might cause cell destruction and denaturation of proteins. The temperature of the lymph fluid passing through the cell separator is regulated between 25° C. and 37° C. and care is taken to provide that the temperature of the lymph does not rise appreciably as the cells enter or leave the centrifuge.

In order to minimize any changes that might occur in the lymph and cells when they are outside the body of the subject, the dead space within the cell separator 70 (or 108) and ancillary equipment is made as small as possible to minimize the time that the lymph cells are outside the body. The lymph cells are retained outside the body for 15 to 80 minutes at the most, and the rate of lymph flow, in sheep and man, is preferably maintained at between 5 litres per day and 12 litres per day.

Figure 3:
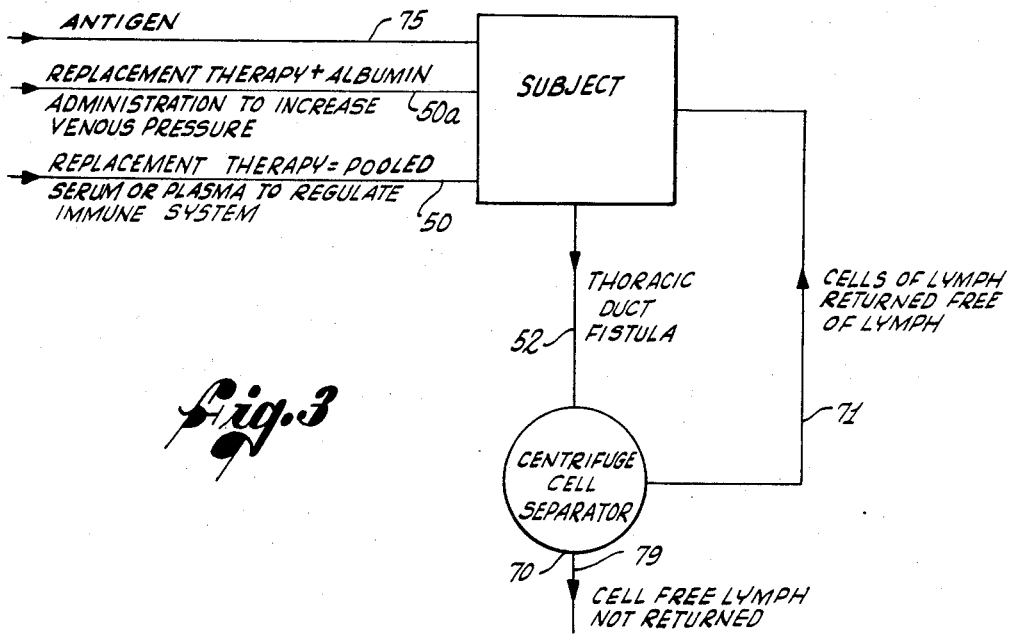
FIG. 3 is a schematic presentation of one embodiment of the process of the invention showing the separation of lymph into cells and lymph fluid. The cells of the lymph are returned free of lymph fluid. The lymph fluid is not returned to the subject who receives instead plasma or serum from non-immunized subjects. In addition, the subject receives antigen and serum or albumin or dextran or other osmotically active materials, the foregoing items (except antigen) being given to increase the venous pressure. The venous pressure can also be elevated by surgical procedures which increase the resistance of the venous return to the heart.
Figure 4:
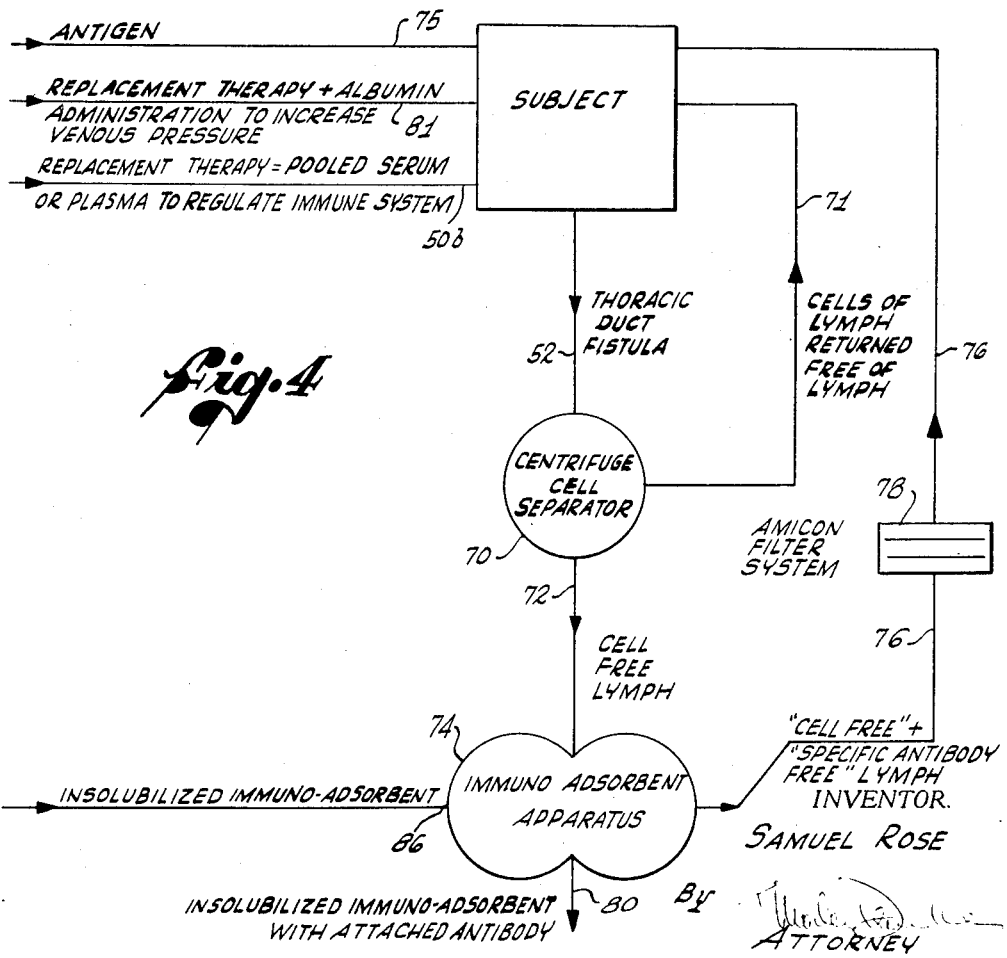
FIG. 4 is a schematic presentation of another embodiment of the process in which antibody is removed from the lymph by an immuno-adsorbent. The cells contained in the lymph are returned to the subject as is the antibody-free and cell-free lymph. In addition, the subject receives antigen and albumin or serum or dextran or other osmotically active materials, the foregoing items (except antigen) being given to increase the venous pressure.
Figure 5:
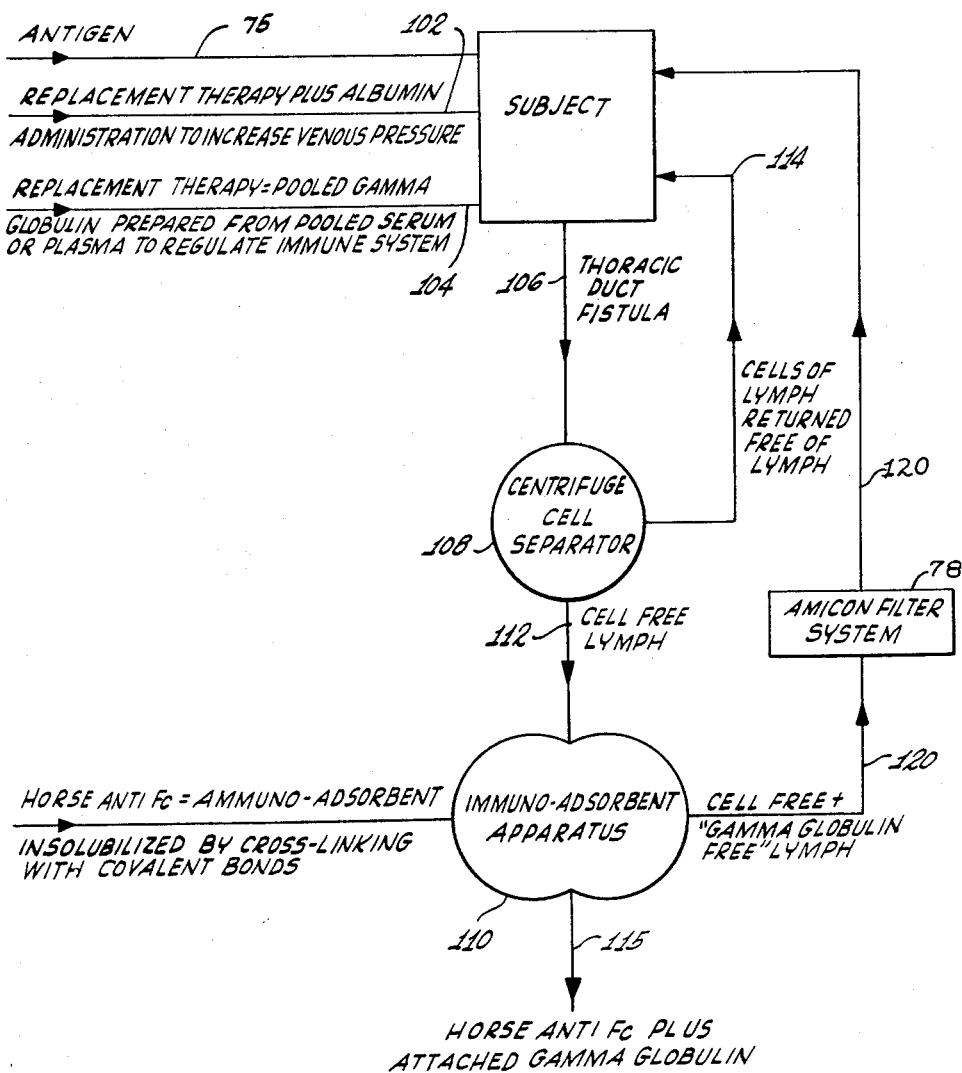
FIG. 5 is a schematic presentation of a third embodiment of the process. The lymph is separated into cells and fluid. The cells are returned to the subject. Gamma-globulin is removed from the lymph by horse (or heterologous) Anti Fc. The subject is given pooled gamma-globulin prepared from pooled serum or plasma. In addition, the subject receives antigen plus albumin (or serum or dextran or other osmotically active materials)

The cell separator 70 (or 108) collects the lymph from the thoracic duct fistula 52, separates the cells from the lymph fluid, washes the cells and returns them to the subject in an undamaged state, intravenously, via line 71 in FIG. 3 or 4, and via line 114 in FIG. 5.

Complete sterility of the equipment is maintained and clotting within the equipment is avoided by the injection of Heparin or other anticoagulant. Build-up of fibrin particles and cellular aggregates are avoided by automatic "flushing" of various critical points of the apparatus. The centrifuge cell separator 70 (or 108) continuously operates and may be monitored to record lymph flow, temperature rise, and other major functions.

While the use of automatic continuous equipment has many advantages over a batch technique, batch techniques may also be used to remove the lymph fluid and return the lymph cells to animals. The advantages of the continuously operating cell separator 70 (or 108) include less manipulation of the cells, less chance of accidental infection, and the shorter period for the lymphocytes to be out of the body.

The cell-free lymph is pumped by any one of a number of pumps, e.g., a tube compression pump from the centrifuge cell separator 70 (or 108), along line 79 to waste in FIG. 3 or along line 72, to an immuno-adsorbent apparatus (IA), bearing numeral 74, in FIG. 4 or along line 112 to immuno-adsorbent apparatus (IA) bearing numeral 110 on FIG. 5. In the latter two cases, the cell-free lymph fluid comes into contact with, and agitated with, an immuno-adsorbent. An insolubilized specific immuno-adsorbent is chosen which adsorbs gamma-globulin (FIG. 5) or other specific antibody (FIG. 4) from the lymph fluid. The gamma-globulin, or other specific antibody, adsorbed onto the immuno-adsorbent, is thus insolubilized and is separated from the cell-free lymph fluid in a continuous flow centrifuge which separates the insoluble material from the lymph fluid automatically. The antibody free lymph is returned to the subject via line 76 (FIG. 4), and line 120 (FIG. 5) after preferably passing through a filter 78. The insolubilized immuno-adsorbent with attached antibody leaves IA apparatus 74 via line 80 as in FIG. 4 or leaves IA 110 via line 115 in FIG. 5. Examples of immuno-adsorbent materials are insolubilized horse (or heterologous) anti Fc (sheep) which will remove sheep gamma-globulin, and insolubilized rabbit albumin, which will remove sheep anti-rabbit albumin.

Again, the removal of the gamma-globulin may be achieved by a batch technique wherein hourly samples of cell-free lymph are adsorbed onto the appropriate immuno-adsorbent, and the remaining fluid is returned to the subject.

The immuno-adsorbent after having been used in the IA apparatus may be regenerated by a special piece of equipment which is not on line with the main flow of body fluids. The regeneration can be achieved by a batch technique either manually (repeated washing and centrifugation and dispersion) or on a column.

The antigen to be given, of course, will vary depending upon the specific type of antibody to be generated and produced in the subject. This administration commenced, via line 75, is prior to fistula. It is possible that continued production, in a highly augmented fashion, of feedback antibody may not occur even under the conditions set forth hereinabove, unless the subject is repeatedly challenged by antigen. The continuation of antigen administration after fistula has become operative, may be a mandatory step in the process.

The immune status of the subject with respect to the normal spectrum of antigenic stimuli which it may come in contact with, is maintained by giving the subject appropriate amounts of pooled plasma or serum or pooled gamma-globulin of that particular species via line 50 in FIG. 3, line 50b in FIG. 4 or line 104 in FIG. 5. While it is possible to specifically and selectively augment the immune response against a specific antigen by removing from the circulation the specific antibody, gamma-globulin (which contains the antibody) as an entity may also be removed from the lymph fluid of the subject.

The method depicted in FIG. 3, while not as complex as the process described in FIG. 4 and FIG. 5 illustrates a basic concept of the invention and is completely operable to augment antibody production in the subject, which may itself, have therapeutic value. Referring to FIG. 3 specifically, the thoracic duct fistula 52 and antigen administration, via line 75, are followed as described earlier, and lymph sent to separator 70 via line 52. The cells of lymph are returned via line 71 to the subject. The total cell-free lymph fluid is wasted, via line 79, and the essential replacement ingredients, i.e., replacement therapy for the subject, entering via line 50a, 50 are pooled plasma or serum of the same species as the subject. Plasma or serum contains components necessary for life and health of the subject *as well as* feed-back antibodies of all kinds *apart* from the feed-back antibody related to the specific antigen to which the subject has been deliberately immunized. The plasma or serum will also increase the venous pressure if given in appropriate amounts. This method does not require an immuno-adsorbent apparatus (IA) or a centrifuge additional to the centrifuge cell separator.

Antigen is fed to the subject, via line 75, as described this invention is illustrated in FIG. 4.

Anitgen is fed to the subject, via line 75, as described with reference to the FIG. 4 embodiment; lymph fluid is removed from the thoracic duct fistula 52 and sent to the centrifuge cell separator 70. The cells of the lymph are returned to the subject via line 71, and the cell-free lymph sent on to the IA apparatus 74, via line 72. In this embodiment the immuno-adsorbent utilized is an insolubilized specific antigen and a specific antibody (and only the specific antibody) is thereby removed from the lymph fluid.

The immuno-adsorbent is fed to an immuno-adsorbent apparatus 74 via line 86, and is intimately admixed with the cell-free lymph entering IA apparatus 74 via line 72. The insolubilized immuno-adsorbent with attached specific antibody is separated out from the IA apparatus and leaves the IA along line 80, and the cell-free, specific antibody-free lymph is returned to the subject.

In FIG. 5, another variant of the basic invention is shown wherein the subject is fed antigen and replacement therapy chemicals of a specific type to be discussed, via lines 75, 102 and 104, respectively. The thoracic duct fistula 106 is made as previously described with reference to FIGS. 3 and 4. The lymph fluid is separated from the lymph cells in a centrifuge cell separator 108, the cell-free lymph proceeding to an IA apparatus 110, via line 112, and the cells returning to the subject via line 114. The processing sequence and apparatus is the same as discussed with reference to FIG. 4. The horse (or heterologous) anti Fc with its attached gamma-globulin leaves the IA via line 115 and the gamma-globulin free lymph is returned to the subject via line 120.

The immuno-adsorbent utilized for the process of FIG. 5 is horse (or heterologous) anti-$F_c$, a specific insolubilized immuno-adsorbent insolubilized by crosslinking with covalent bonds. The horse (or heterologous) anti-$F_c$ removes the gamma-globulin (containing the specific antibody) from the lymph and pooled gamma-globulin or pooled serum is utilized for the replacement therapy (line 104) as well as the replacement components, including albumin serum or dextran to raise the venous pressure (line 102).

In the following Examples 1–32, the augmentation of antibody production, and the collection thereof is illustrated with reference to (a) antigen administration and (b) a thoracic duct fistula performed but without splenectomy and without raising the central venous pressure of the subject. Highly augmented production of antibody results as compared with antibody production in the control subjects. Examples 33 and 34 illustrate the optimal mode of procedure of this invention wherein splenectomy and increased central venous pressures are employed.

Specific examples of the process of this invention follow:

EXAMPLES 1–32

In the following examples, 23 control rats and 9 experimental rats were each administered antigen for a given period of time. A thoracic duct fistula was performed on the experimental rats. No thoracic duct fistula was performed on the control rats. No splenectomy or increased central venous pressure procedures were utilized with the experimental rats.

The total number of antibody cells in the spleen and in the mesenteric lymph nodes in both central and experimental rats as well as 19S plaque-forming cells and 7S antibody cells were measured.

Details of the procedures are set forth below.

The animals used were Holtzman rats (250–350 gm. in weight). Antigen administration comprised each rat receiving, intravenously, $10^9$ freshly washed sheep red blood cells (SRBC) in 1 ml. of saline solution. The SRBC were given at the beginning of the experiment and every three days thereafter.

Fistula procedures were performed on the experimental rats at various times after the first antigen administration. The thoracic duct fistula was performed by a standard technique except that the catheter was made to have a double lumen. The larger lumen tube is the tube through which the lymph flows, and has a polyethylene tip which is attached to a silastic tube. The tip has a bevel for ease of entry and a bump to ensure that the ties behind the bump keep the catheter in position.

The silastic tube which forms the main part of the catheter provides flexibility so that small errors of alignment are corrected without tension on the duct. The smaller lumen is made from polyethylene and is drawn out in a hot stream of nitrogen to a diameter of 100 microns. The nitrogen prevents oxidation of the surface of the polyethylene during the drawing out procedure. The polyethylene surface thus retains its excellent anti-clotting property.

The smaller tube of the catheter lies inside the main tube and carries heparin in Ringers solution to the very tip of the catheter. The Ringers solution, containing 10 units of heparin/ml. was infused into the experimental rats at a rate of 1–2 ml./hr. up the catheter. This prevented the lymph from clotting and prevented the catheter from being blocked also by cellular aggregates.

Lymph collection is made by collecting it from the fistula in the experimental animals in ice cold 50 ml. polycarbonate centrifuge tubes, each containing 5 ml. of Ringers solution. (Each ml. of Ringers solution contains 20 units of heparin, 0.1 mg. of streptomycin and 100 units of penicillin). The lymph was collected in 12-hourly batches, evenly suspended and a sample taken for a white cell count (which was performed with a Coulter counter). The lymph was then centrifuged and the lymph fluid (mixed with Ringers solution) was withdrawn, kept in separate containers and deep-frozen for subsequent assays.

The lymph cells were suspended in 2 ml. of rat plasma and immediately returned intravenously as follows:

A polyethylene catheter (polyethylene PE 50), was drawn down to ¼ mm. was inserted into the femoral vein in such a way that the top of the catheter was located in the iliac vein or inferior vena-cava. It was found that, for success, the top of the venous catheter should lie in a large vein so as to make possible the returning of the cells, and the administration of medication through the intravenous route over an extended period— without causing thrombosis of the vessel. Ringers solution, containing 2 units heparin/ml. was infused intravenously at the rate of 1–2 ml./hr. In addition approximately 10–25 ml. of rat serum was infused each day.

Replacement therapy is provided as follows:

A silastic tube was inserted into the stomach of each rat and sealed in position by a double row of purse string nylon atraumatic sutures. Each rat received increasing amounts of high protein and high calorie liquid food through the gastric tube. On the second day of the fistula 10 ml. of this liquid food was given three times per day. Between feedings, a continuous (1 ml./hr.) gastric drip of Ringers solution was given.

The 4 tubes (thoracic duct cannula, heparin line to cannula, intravenous catheter and gastric tube) pass from their sites of insertion and run subcutaneously to emerge from beneath the skin of the tail. In this way, when the animal is placed in a conventional restraining cage, the experimentor has access to all catheters, whereas the rat cannot interfere with these tubes.

The number of 19–S haemolysin producing cells in the spleen and mesenteric lymph nodes were estimated by localized haemolysis (plaques) using agar as a thickening agent (following Jerne, N. K., and Nordin, A. A—Science 140: 405, 1963).

Antibody was assayed by the micro-titre agglutination technique. 7–S antibody was measured as the 2 ME resistant antibody. Blood was collected by cutting tail veins. Serum was separated from the clot after standing overnight at 2–5° C. and was inactivated by heating at 56° for 30 minutes. The titres from a given experiment were determined simultaneously.

Lymph was collected in 12-hourly batches, evenly suspended, samples withdrawn, the remainder centrifuged and the supernatant fluid withdrawn. Each lymph sample was corrected for the dilution caused by injection of Ringers (containing heparin) into the cannula and by the volume (5 ml.) of Ringers, which was originally placed in the centrifuge tubes. The agglutination titres in the successive lymph samples of any rat were estimated simultaneously.

The rats were maintained in a fairly good health. Their degree of hydration was normal and each rat only lost approximately 4–6% of this body weight.

Table 1 and Graph 1 (FIG. 7) show the number of 19S antibody producing cells (Jerne plaque positive cells) in the spleens of the control and experimental rats. In the 23 control rats, there is an increasing number of plaque forming cells until day 8 (the sixth day after antigen administration) followed by a sharp decline. The thoracic duct fistula and cell-return procedure was performed on the experimental rats as follows: 2nd day after antigen administration (rats 4, 21, 22), on the 10th day (rat 41) and on the 11th day, (rats 42, 43, 45), and finally on the 19th day (rats 33, 34), after the first antigen administration.

A 4–20 fold increase in the number of plaque cells in the spleens of the experimental rats occurred (compared to the 23 control rats, which were killed and analyzed after the same duration of repeated antigen administration). The rate of increase of plaque forming cells in spleens of rats operated 2 days after the first antigen administration (rats 4, 21, 22) was faster than in the spleens of rats operated at later dates.

Table II and FIG. 7 show that a generally similar result occurs in the mesenteric lymph nodes as in the spleen.

Antibody titres in blood.—The total and 7S antibody (agglutination titre) in the blood of control and experimental animals (rats 42, 43, 44—11 days after first antigen administration) is shown in Table III and FIG. 8. In the control rats there is a rapid rise in the blood titre until day 8, with a subsequent fall and plateau. (The rise in antibody titre is measured as a ratio of amount on the day measured to day 1 of the test.) 19S antibody becomes undetectable after day 10. In the experimental rats there is a transient marked fall in the blood titre followed by a rise and overshoot. In addition 19S antibody reappears and transiently increases.

Daily antibody content and (therefore loss) in lymph.—The volume of lymph lost was irregular and varied from 12–87 ml./day.

The average loss of total and 7S antibody in the lymph is shown in Table IV (for rats 42, 43, 44) and Table V (for rats 33, 34). The individual results of these animals are shown in Tables VI, VII, VIII, IX and X, as well as in FIG. 9. (Total and 7–S antibody), FIG. 10, (total antibody) and FIG. 11 (7–S antibody). In addition, the ratio of total antibody lost on any day of the fistula compared to day 1 is given in Table IV, column 6 (average for rats 42, 43, 44); Tables V–VII, column 6 (individual values for rats 33, 34). In all animals there is a short lag period followed by increasing loss, reaching a value 19 times (average for rats 42, 43, 44) and 82 times (average for rats 33, 34) higher on the last as compared to the first day of fistula.

Daily antibody lost in lymph compared to total antibody content of blood.—The daily loss of antibody in the lymph increases, and is 10–30 times the total blood content on any one day. (Table IV, average for rats 42, 43, 44—compare columns 4 and 8 for total antibody and columns 5 and 10 for 7–S antibody.) Similar comparisons of individual rats are given in Tables V, VI and VII. For rats 33 and 34 the antibody content of the blood was only estimated on the day they were killed, that is after 7 days of lymph drainage. The results are shown in Table VIII. The total antibody lost on the last day of lymph drainage was 20 times the total blood content.

TABLE I.—19–S PLAQUE FORMING CELLS IN SPLEEN OF CONTROLS AND EXPERIMENTAL ANIMALS (PER $10^6$ SPLEEN CELLS)

| Days after repeated antigen administration | Controls | Experimental rats | | | | | | | | | |
|---|---|---|---|---|---|---|---|---|---|---|---|
| | | R4 | R21 | R22 | R32 | R33 | R41 | R42 | R43 | R44 | R45 |
| 0 | 0 | | | | | | | | | | |
| 1 | 38 | 65 | | | | | | | | | |
| 2 | 84 | 90 | (*) | (*) | (*) | | | | | | |
| 3 | 98 | | (*) | (*) | (*) | | | | | | |
| 4 | 96 | 126 | (*) | (*) | (*) | | | | | | |
| 5 | 346 | 450 | (*) | **1,800 | **2,240 | | | | | | |
| 6 | 712 | | **4,530 | | | | | | | | |
| 7 | 576 | | | | | | | | | | |
| 8 | 847 | 1,056 | | | | | | | | | |
| 9 | 672 | | | | | | | | | | |
| 10 | 480 | | | | | | (*) | (*) | (*) | (*) | (*) |
| 11 | 422 | | | | | | (*) | (*) | (*) | (*) | (*) |
| 12 | 336 | | | | | | (*) | (*) | (*) | (*) | (*) |
| 13 | | | | | | | (*) | (*) | (*) | (*) | (*) |
| 14 | | | | | | | (*) | (*) | (*) | (*) | (*) |
| 15 | | | | | | | (*) | (*) | (*) | (*) | (*) |
| 16 | 140 | 163 | | | | | (*) | (*) | (*) | (*) | 1 **452 |
| 17 | | | | | | | 2 **480 | (*) | (*) | (*) | |
| 18 | | | | | | | | | | | |
| 19 | 110 | | | | | (*) | (*) | | **1,920 | **1,400 | **2,000 | |
| 20 | 96 | | | | | (*) | (*) | | | | | |
| 21 | | | | | | (*) | (*) | | | | | |
| 22 | 83 | | | | | **252 | (*) | | | | | |
| 23 | | | | | | | (*) | | | | | |
| 24 | | | | | | | (*) | | | | | |
| 25 | 63 | | | | | **596 | | | | | | |

[1] R 45=Lymph stopped on 3rd day of fistula, flow intermittent.
[2] R 41=Lymph flow intermittent, stopped 2 days prior to death.
*Indicates day of fistula.
**Indicates day when rat was killed.

TABLE II.—19-S PLAQUE FORMING CELLS IN MESENTERIC LYMPH NODES (PER 10⁷ CELLS)

| Days after repeated antigen administration | Controls | Experimental rats | | | | | | |
|---|---|---|---|---|---|---|---|---|
| | | R4 | R21 | R22 | R41 | R42 | R43 | R45 |
| 0 | 0 | | | | | | | |
| 1 | 0 | | | | | | | |
| 2 | 30 | (*) | (*) | (*) | | | | |
| 3 | 30 | (*) | (*) | (*) | | | | |
| 4 | 30 | (*) | (*) | (*) | | | | |
| 5 | 90 | (*) | **3,260 | **370 | | | | |
| 6 | 0 | **560 | | | | | | |
| 7 | 60 | | | | | | | |
| 8 | 35 | | | | | | | |
| 9 | 57 | | | | | | | |
| 10 | 13 | | | | (*) | | | |
| 11 | 5 | | | | (*) | (*) | (*) | (*) |
| 12 | | | | | (*) | (*) | (*) | (*) |
| 13 | | | | | (*) | (*) | (*) | (*) |
| 14 | | | | | (*) | (*) | (*) | (*) |
| 15 | | | | | (*) | (*) | (*) | (*) |
| 16 | 20; 18 | | | | (*) | (*) | (*) | ¹**50 |
| 17 | | | | | (*) | (*) | (*) | |
| 18 | | | | | ²**50 | (*) | (*) | |
| 19 | 30 | | | | | **1,200 | **2,270 | |
| 20 | | | | | 30 | | | |

¹ R41=Lymph flow intermittent stopped 2 days prior to death.
² R45=Lymph stopped on 3rd day of fistula, flow intermittent.
*Indicates day of fistula.
**Indicates day when rat was killed.

TABLE III.—DAILY BLOOD ANTIBODY TITRES IN CONTROLS AND EXPERIMENTAL ANIMALS—AVERAGES

| Days after repeated antigen administration | Total antibody | | 7-S antibody titre | |
|---|---|---|---|---|
| | Control rats | Exp. rats (R-42, 43, 44) | Control rats | Exp. rats (R-42, 43, 44) |
| 0 | 0 | | 0 | |
| 1 | 0 | | 0 | |
| 2 | 1:2 | | 0 | |
| 3 | 1:8 | | 1:1 | |
| 4 | 1:32 | | 1:2 | |
| 5 | 1:64 | | 1:8 | |
| 6 | | | | |
| 7 | 1:128 | | 1:32 | |
| 8 | 1:256 | | 1:128 | |
| 9 | 1:128 | | 1:64 | |
| 10 | 1:64 | | 1:32 | |
| 11 | 1:64 | ²1:64 | 1:32 | ²1:32 |
| 12 | 1:64 | 1:16 | 1:32 | 1:8 |
| 13 | 1:32 | 1:8 | 1:32 | 1:4 |
| 14 | 1:32 | 1:4 | 1:32 | 1:1 |
| 15 | | | | |
| 16 | 1:32 | 1:16 | 1:32 | 1:4 |
| 17 | 1:32 | 1:32 | 1:32 | 1:8 |
| 18 | 1:32 | 1:32 | 1:32 | 1:16 |
| 19 | 1:32 | 1:64 | 1:32 | 1:64 |
| 20 | 1:32 | | 1:32 | |

¹ =Day before immunization. ² Day of fistula.

TABLE V.—AVERAGE OF DAILY VALUES—RATS 33 AND 34

| (1) | (2) | (3) | (4) | (5) | (6) |
|---|---|---|---|---|---|
| Days post Immunization³ | Fistula | Lymph lost per day in ml. | Antibody lost in lymph per day¹ | | |
| | | | Total antibody | 7-S antibody | Total compared to day 1 |
| 20 | 1 | 32 | 192 | 106 | 1 |
| 21 | 2 | 38 | 349 | 18 | 1.8 |
| 22 | 3 | 24 | 221 | 29 | 1.2 |
| 23 | 4 | 31 | 498 | 105 | 2.6 |
| 24 | 5 | 31 | 6,064 | 312 | 32.0 |
| 25 | 6 | 38 | 13,295 | 1,742 | 69.0 |
| 26 | 7 | 43 | 15,812 | 8,491 | 82.0 |

| Antibody in blood:³ | Total | 7-S |
|---|---|---|
| Control | 480 | 480 |
| Experimental | 800 | 480 |

¹ Antibody measured in agglutinating units: 1 agg. u. represents a positive hemagglutinin titre in undiluted first tube (i.e.) agg. u.=volume (of lymph/or blood)×Serial dilution titre. Total agglutinating units of blood based on estimated serum volume of 10 ml. per rat.
² Immunization=10⁹ SRBC given i.v. 19 days prior to fistula and every 3 days thereafter.
³ At post mortem.

TABLE IV.—AVERAGE OF DAILY VALUES—RATS 42; 43; 44

| (1) | (2) | (3) | (4) | (5) | (6) | (7) | (8) | (9) | (10) |
|---|---|---|---|---|---|---|---|---|---|
| Days post Immunization² | Fistula | Lymph lost per day in ml. | Antibody lost in lymph per day¹ | | | Content of antibody in blood¹ | | | |
| | | | | | | Total antibody | | 7-S antibody | |
| | | | Total | 7-S | Total compared to day 1 | Control rats | Experimental rats | Control rats | Experimental rats |
| 11 | 0 | Nil | Nil | Nil | | 640 | | 320 | |
| 12 | 1 | 17 | 378 | 232 | 1 | 640 | 160 | 320 | 107 |
| 13 | 2 | 48 | 2,182 | 323 | 5.8 | 320 | 80 | 320 | 33 |
| 14 | 3 | 52 | 3,334 | 398 | 8.8 | 320 | 40 | 320 | 10 |
| 15 | 4 | 52 | 2,995 | 212 | 8.0 | (³) | (³) | (³) | (³) |
| 16 | 5 | 58 | 2,430 | 308 | 6.3 | 320 | 160 | 320 | 47 |
| 17 | 6 | 60 | 4,325 | 673 | 11.5 | 320 | 320 | 320 | 160 |
| 19 | 8 | 67 | 7,148 | 7,148 | 19.0 | 320 | 533 | 320 | 533 |

¹ Antibody measured in agglutinating units; 1 agg. u. represents a positive hemagglutinin titre in undiluted first tube. Example: Agg. u.=volume (of lymph/or blood)×Serial dilution titre. Total agg. units of blood based on estimated serum volume of 10 ml. per rat.
² Immunization=10⁹ SRBC given i.v. 11 days prior to fistula and every 3 days thereafter.
³ Not tested.

TABLE VI.—DAILY RESULTS—RAT 42

| (1) | (2) | (3) | (4) | (5) | (6) | (7) | (8) | (9) | (10) |
|---|---|---|---|---|---|---|---|---|---|
| Days post Immunization [2] | Fistula | Lymph lost per day in ml. | Antibody lost in lymph per day [1] | | | Blood titre | | Content of antibody in blood [1] | |
| | | | Total | 7-S | Total compared to day 1 | Total antibody | 7-S antibody | Total antibody | 7-S antibody |
| 12 | 1 | 25 | 360 | 360 | 1 | 1:16 | 1:8 | 160 | 80 |
| 13 | 2 | 42 | 1,500 | 261 | 4.2 | 1:8 | 1:4 | 80 | 40 |
| 14 | 3 | 31 | 2,592 | 111 | 7.2 | 1:4 | 1:1 | 40 | 10 |
| 15 | 4 | 46 | 1,334 | 83 | 3.7 | (3) | (3) | (3) | (3) |
| 16 | 5 | 45 | 1,350 | 85 | 3.8 | 1:16 | 1:8 | 160 | 80 |
| 17 | 6 | 68 | 3,975 | 598 | 11.0 | 1:32 | 1:16 | 320 | 160 |
| 18 | 7 | 40 | 6,040 | 2,195 | 16.8 | 1:32 | 1:16 | 320 | 160 |
| 19 | 8 | 64 | 7,259 | 7,259 | 20.1 | 1:32 | 1:32 | 320 | 320 |

[1] Antibody measured in agglutinating units; 1 agg. u. represents a positive hemagglutinin titre in undiluted first tube. Example: Agg. u. = volume (of lymph/or blood) × Serial dilution titre. Total agg. units of blood based on estimated serum volume of 10 ml. per rat.
[2] Immunization = 10⁹ SRBC given i.v. 11 days prior to fistula and every 3 days thereafter.
[3] Not tested.

TABLE VII.—DAILY RESULTS—RAT 43

| (1) | (2) | (3) | (4) | (5) | (6) | (7) | (8) | (9) | (10) |
|---|---|---|---|---|---|---|---|---|---|
| Days post Immunization [2] | Fistula | Lymph lost per day in ml. | Antibody lost in lymph per day [1] | | | Blood titre | | Content of antibody in blood [1] | |
| | | | Total | 7-S | Total compared to day 1 | Total antibody | 7-S antibody | Total antibody | 7-S antibody |
| 12 | 1 | 12 | 348 | 122 | 1 | 1:16 | 1:8 | 160 | 80 |
| 13 | 2 | 49 | 1,356 | 337 | 3.9 | 1:8 | 1:2 | 80 | 20 |
| 14 | 3 | 52 | 1,558 | 240 | 4.5 | 1:4 | 1:1 | 40 | 10 |
| 15 | 4 | 51 | 4,291 | 133 | 12.3 | (3) | (3) | (3) | (3) |
| 16 | 5 | 64 | 2,432 | 307 | 7.0 | 1:16 | 1:2 | 160 | 20 |
| 17 | 6 | 56 | 4,689 | 566 | 13.5 | 1:32 | 1:4 | 320 | 40 |
| 18 | 7 | 58 | 3,869 | 2,018 | 11.1 | 1:32 | 1:16 | 320 | 160 |
| 19 | 8 | 87 | 7,041 | 7,041 | 20.2 | 1:64 | 1:64 | 640 | 640 |

[1] Antibody measured in agglutinating units; 1 agg. u. represents a positive hemagglutinin titre in undiluted first tube. Example: Agg. u. = volume (of lymph/or blood) × Serial dilution titre. Total agg. units of blood based on estimated serum volume of 10 ml. per rat.
[2] Immunization = 10⁹ SRBC given i.v. 11 days prior to fistula and every 3 days thereafter.
[3] Not tested.

TABLE VIII.—DAILY RESULTS—RAT 44

| (1) | (2) | (3) | (4) | (5) | (6) | (7) | (8) | (9) | (10) |
|---|---|---|---|---|---|---|---|---|---|
| Days post Immunization [2] | Fistula | Lymph lost per day in ml. | Antibody lost in lymph per day [1] | | | Blood titre | | Content of antibody in blood [1] | |
| | | | Total | 7-S | Total compared to day 1 | Total antibody | 7-S antibody | Total antibody | 7-S antibody |
| 12 | 1 | 13 | 425 | 213 | 1 | 1:16 | 1:16 | 160 | 160 |
| 13 | 2 | 53 | 3,690 | 371 | 8.7 | 1:8 | 1:4 | 80 | 40 |
| 14 | 3 | 73 | 5,853 | 444 | 13.8 | 1:4 | 1:1 | 40 | 10 |
| 15 | 4 | 59 | 3,360 | 420 | 7.9 | (3) | (3) | (3) | (3) |
| 16 | 5 | 64 | 3,450 | 532 | 8.1 | 1:16 | 1:4 | 160 | 40 |
| 17 | 6 | 56 | 4,312 | 855 | 10.1 | 1:32 | 1:8 | 320 | 80 |
| 18 | 7 | 56 | 7,220 | 1,939 | 16.9 | 1:64 | 1:16 | 640 | 160 |
| 19 | 8 | 51 | 7,143 | 7,143 | 16.8 | 1:64 | 1:64 | 640 | 640 |

[1] Antibody measured in agglutinating units; 1 agg. u. represents a positive hemagglutinin titre in undiluted first tube. Example: Agg. u. = volume (of lymph/or blood) × Serial dilution titre. Total agg. units of blood based on estimated serum volume of 10 ml. per rat.
[2] Immunization = 10⁹ SRBC given i.v. 11 days prior to fistula and every 3 days thereafter.
[3] Not tested.

TABLE IX.—DAILY VALUES—RAT 33

| (1) | (2) | (3) | (4) | (5) | (6) |
|---|---|---|---|---|---|
| Days post Immunization [2] | Fistula | Lymph lost per day in ml. | Antibody lost in lymph per day [1] | | |
| | | | Total antibody | 7-S antibody | Total compared to day 1 |
| 20 | 1 | 16 | 260 | 130 | 1 |
| 21 | 2 | 37 | 395 | 0 | 1.5 |
| 22 | 3 | 26 | 266 | 0 | 1.02 |
| 23 | 4 | 30 | 435 | 108 | 1.7 |
| 24 | 5 | 39 | 9,179 | 448 | 35.3 |
| 25 | 6 | 39 | 10,482 | 544 | 40.3 |
| 26 | 7 | 48 | 20,544 | 10,260 | 79.0 |

| | Total | 7-S |
|---|---|---|
| Antibody in blood: [3] | | |
| Control | 640 | 640 |
| Experimental | 1,280 | 640 |

[1] Antibody measured in agglutinating units: 1 agg. u. represents a positive hemagglutinin titre in undiluted first tube (i.e.) agg. u. = volume (of lymph/or blood) × Serial dilution titre. Total agglutinating units of blood based on estimated serum volume of 10 ml. per rat.
[2] Immunization = 10⁹ SRBC given i.v. 19 days prior to fistula and every 3 days thereafter.
[3] At post mortem.

TABLE X.—DAILY VALUES—RAT 34

| (1) | (2) | (3) | (4) | (5) | (6) |
|---|---|---|---|---|---|
| Days post Immunization [2] | Fistula | Lymph lost per day in ml. | Antibody lost in lymph per day [1] | | |
| | | | Total antibody | 7-S antibody | Total compared to day 1 |
| 20 | 1 | 48 | 124 | 82 | 1 |
| 21 | 2 | 39 | 303 | 35 | 2.4 |
| 22 | 3 | 22 | 176 | 58 | 1.4 |
| 23 | 4 | 32 | 560 | 101 | 4.5 |
| 24 | 5 | 23 | 2,950 | 176 | 23.8 |
| 25 | 6 | 37 | 16,108 | 3,065 | 130.0 |
| 26 | 7 | 41 | 13,446 | 6,722 | 108.0 |

| | Total | 7-S |
|---|---|---|
| Antibody in blood: [3] | | |
| Control | 320 | 320 |
| Experimental | 320 | 320 |

[1] Antibody measured in agglutinating units: 1 agg. u. represents a positive hemagglutinin titre in undiluted first tube (i.e.) agg. u. = volume (of lymph/or blood) × Serial dilution titre. Total agglutinating units of blood based on estimated serum volume of 10 ml. per rat.
[2] Immunization = 10⁹ SRBC given i.v. 19 days prior to fistula and every 3 days thereafter.
[3] At post mortem.

Establishing a thoracic duct fistula, wasting the lymph fluid and providing adequate replacement therapy therefor, and returning the cells contained in the lymph, causes the following results in rats who are given repeated injections of SRBC:

(1) There is an increasing antibody loss in the lymph fluid with duration of fistula.

(2) The daily amount of antibody lost in the lymph fluid exceeds the antibody content in the blood at any one time by a factor of 10–30.

(3) The large loss of antibody in the lymph causes a transient fall in the antibody titre in the blood.

(4) The fall in the blood titre can be interpreted best as acting in the manner of reduced feed-back control on the immune system. This, in conjunction with repeated antigen administration results in—

(a) an increase in the number of 19S plaque forming cells in spleen and lymph nodes. (The number of 7S plaque forming cells was not measured.)

(b) an increasing daily production of total and 7S antibody (estimated by loss in lymph, not accountable for by decreasing blood content).

(c) the reappearance in blood and lymph of 19S antibody.

EXAMPLES 33 AND 34

The proportions of feedback antibody produced can be greatly increased over those set forth in Examples 1–32 by splenectomy procedures as well as by the increase in systemic venous pressure, as has been described previously. Examples incorporating these additional proceduces are set forth below.

2 Rats (R55 and R56) were splenectomized three weeks prior to the first antigen administration. Systemic venous pressure was raised by administration of rat serum intravenously. The pressure in the venous system was raised to between 12 to 20 centimeters water pressure above atmospheric. The venous pressure was measured three times each day by a simple saline manometer attached to a central venous catheter. The volume of a 60% serum solution necessary to maintain the elevated venous pressure was estimated from the previous lymph lost and the venous pressure. Each rat received 50–80 ml. of 60% serum solution each day. The venous pressure remained elevated to levels between 12 cms. and 20 cms. of hydrostatic head.

Antigen administration and thoracic duct fistulas on R55 and R56 were performed as described with reference to Examples 1 through 32. Lymph production for R55 and R56 is shown in Graphs VII and VIII (FIGS. 13 and 14, respectively), together with total antibody measured in agglutinating units. Graph IX (FIG. 14) is a comparison of the net lymph production and the total agglutination units of antibody in the lymph for R55 and R56 as compared with the best production from R33 and R34. This, of course, provides a direct comparison between procedures wherein venous pressures and splenectomy procedures where only a thoracic duct fistula was made without venous pressures and without splenectomy (R33 and R34).

The difference in antibody production between the two procedures is evident and is of a higher order of magnitude when the venous pressure is raised and splenectomy procedures are performed.

While various procedures are herein set forth, other modifications and variations will occur to those skilled in the art. I intend, therefore, to be bound only by the claims which follow:

I claim:

1. A process for the augmentation of production of a specific antibody from a patient which comprises:
   administering a specific antigen to said patient to cause production of the specific antibody;
   performing a thoracic duct fistula and collecting lymph from said fistula;
   separating the lymph cells substantially free of specific antibody from the lymph fluid;
   returning the lymph cells to the patient intravenously;
   and providing replacement therapy to the patient, intravenously.

2. The process of claim 1 wherein said replacement therapy includes plasma from non-immunized patients of the same species as the patient being treated.

3. The process of claim 1 wherein said replacement therapy includes pooled serum from non-immunized patients of the same species as the patient being treated.

4. The process of claim 1 wherein said replacement therapy comprises lymph of the same species as the patient being treated and substantially free of the specific antibody.

5. The process of claim 1 wherein the central venous pressure of the patient is elevated to about 12–25 cms. of water pressure.

6. The process of claim 5 wherein the central venous pressure of the patient is raised by surgical procedures.

7. The process of claim 5 wherein the central venous pressure of the patient is raised by intravenous infusions of osmotically active material.

8. The process of claim 1 wherein said replacement therapy includes intravenous infusions of medicaments selected from the group consisting of albumin, serum, and dextran.

9. The process of claim 1 wherein a splenectomy is performed on said patient prior to the administration of antigen, and prior to performing said fistula.

10. The process of claim 5 wherein the central venous pressure of the patient is raised by a combination of surgical procedures and intravenous infusions of osmotically active material.

11. The process of claim 1 wherein a splenectomy is performed on said patient after the administration of antigen, and prior to performing said fistula.

12. The process of claim 1 wherein the patient is an animal.

13. The process of claim 1 wherein the patient is a human being.

14. The process of claim 1 wherein the antigen is selected from the group consisting of proteins, infectious agents including viruses and bacteria, cellular antigens including cells containing normal or malignant transplantation antigens, RR antigens, and antigens specific to particular cells or tissues.

15. A process for the augmentation of production and collection of a specific antibody from a patient which comprises:
   administering a specific antigen to said patient to cause production of the specific antibody;
   performing a thoracic duct fistula and collecting lymph from said fistula;
   separating cells from said lymph and returning said cells to the patient intravenously;
   removing the specific antibody from said cell-free lymph to produce lymph substantially free of the specific antibody;
   and intravenously replacing said lymph with one or more members of the group selected from (a) lymph substantially free of the specific antibody, (b) proteins, (c) sugars, (d) carbohydrates, (e) antibiotics, and (f) medicaments, whereby production of the specific antibody in said lymph fluid, flowing from said fistula, increases significantly after a short period.

16. The process of claim 15 wherein the pressure of the central venous system of said patient is raised to between about 12 to about 25 cm. of water pressure at about the time of performing said fistula;
   and maintaining said pressure during the period of time that lymph is collected from said patient.

17. The specific process of claim 15 wherein the antibody removed from said lymph is removed by removing gamma-globulin.

18. The process of claim 15 wherein the specific antibody is removed from said lymph by an insolubilized immuno-adsorbent.

19. The process of claim 15 wherein the specific antibody is removed from said lymph by an insolubilized immuno-adsorbent selected from the group consisting of horse anti-$F_c$, horse anti-gamma-globulin, heterologous anti-$F_c$ and heterologous anti-gamma-globulin.

References Cited
UNITED STATES PATENTS

| | | | |
|---|---|---|---|
| 3,407,812 | 10/1968 | Lucas | 128—214 R |
| 3,511,238 | 5/1970 | Von Wrangell | 128—214 R |
| 3,515,124 | 6/1970 | Gurchot | 128—1 R |

OTHER REFERENCES

Engeset et al., Scand. Jour. Clin. Lab. Invest. 22, Suppl. 106: 119+, 1968.

Shellam, Immunology, 17: 267–280, August 1969.

Gallo-Torres et al., Proc. Soc. Exper. Biol. Med. 130: 552–555, February 1969.

Strober, Jour. Exper. Med., 130: 895–906, October 1969.

DALTON L. TRULUCK, Primary Examiner

U.S. Cl. X.R.

128—214 R; 195—1.7; 260—112; 424—85, 101

UNITED STATES PATENT OFFICE
CERTIFICATE OF CORRECTION

Patent No. 3,719,182      Dated March 6, 1973

Inventor(s) Samuel Rose

It is certified that error appears in the above-identified patent and that said Letters Patent are hereby corrected as shown below:

Column 5, line 75, change "thioracic" to --thoracic--.

Column 6, line 50, change "toracic duct" to --thoracic duct--.

Column 9, lines 8 to 10, a sentence is missing, after "separator" insert --Another mode of treatment utilizing the concepts of this invention is illustrated in Fig. 4--

Column 9, line 43, change "$F_c$" to --Fc--.

Column 9, line 46, change "$F_c$" to --Fc--.

Column 10, line 31, change "heparin" to --Heparin--.

Column 10 line 39, change "heparin" to --Heparin--.

Column 10, line 39, change "streptomycin" to Streptomycin --.

Column 10, line 40, change "penicillin)." to --Penicillin.)--

Column 10, line 43, change "counter" to --Counter--.

Column 10, line 49, change "polyethylene" to --Polyethylene--.

Column 10, line 58, change "heparin" to --Heparin--.

Column 10, lines 71 - 72, change "(toracic duct cannula, heparin line to cannula, intravenous catheter and gastric tube) to --(Thoracic Duct Cannula, Heparin

UNITED STATES PATENT OFFICE
CERTIFICATE OF CORRECTION

Patent No. 3,719,182          Dated  March 6, 1973

Inventor(s)  Samuel Rose

It is certified that error appears in the above-identified patent and that said Letters Patent are hereby corrected as shown below:

Line to Cannula, Intravenous Catheter and Gastric Tube}--.

Column 11, line 3, change "haemolysin" to --Haemolysin--.

Column 11, line 5, change "plaques" to --Plaques--.

Column 11, line 5, change "agar" to --Agar--.

Column 11, line 6, change "A.A-" to --A.A.- --.

Column 11, line 8, change "micro-titre agglutination" to --Micro-Titre Agglutination--.

Column 11, line 9, change "technique" to --Technique--.

Column 11, line 26, change "Table" to --TABLE--.

Column 11, line 26, change "Graph" to --GRAPH--.

Column 11, line 33, change "rats" to --Rats--.

Column 11, line 36, change "rats" to --Rats--.

Column 11, line 44, change "rats" to --Rats--.

Column 12, line 1, change "Table" to --TABLE--.

Column 12, line 3, change "titres in blood" to --Titres in Blood: --.

UNITED STATES PATENT OFFICE
CERTIFICATE OF CORRECTION

Patent No. 3,719,182      Dated March 6, 1973

Inventor(s) Samuel Rose

It is certified that error appears in the above-identified patent and that said Letters Patent are hereby corrected as shown below:

Column 12, line 4, change "agglutination titre" to --Agglutination Titre--.

Column 12, line 6, change "Table" to --TABLE--.

Column 12, line 15, change "antibody content and (therefore loss) in lymph.-" to --Antibody Content and (therefore loss) in Lymph:--.

Column 12, line 19, change "Table" to --TABLE--.

Column 12, line 21, change "Table" to --TABLE--.

Column 12, line 22, change "antibody" to --Antibody--.

Column 12, line 23, change "antibody" to --Antibody--.

Column 12, line 26, change "table" to --TABLE--.

Column 12, line 27, change "table" to --TABLE--.

Column 12, line 26, change "column" to --Column--.

Column 12, line 27, change "column" to --Column--.

Column 12, line 26, change "average" to --Average--.

Column 12, line 27, change "rats" to --Rats--.

UNITED STATES PATENT OFFICE
CERTIFICATE OF CORRECTION

Patent No. 3,719,182  Dated March 6, 1973

Inventor(s) Samuel Rose

It is certified that error appears in the above-identified patent and that said Letters Patent are hereby corrected as shown below:

Column 12, line 27, change "rats" to --Rats--.

Column 12, line 27, change "individual" to --Indivisual--.

Column 12, line 30, change "average" to --Average--.

Column 12, line 30, change "rats" to --Rats--.

Column 12, line 31, change "average" to --Average--.

Column 12, line 31, change "rats" to --Rats--.

Column 12, lines 33-34 change "Daily antibody lost in lymph compated to total antibody content of blood.-" to --Daily Antibody Lost in Lymph Compared to Total Antibody Content of Blood:--.

Column 12, line 37, change "Table" to --TABLE--.

Column 12, line 37, change "average" to --Average--.

Column 12, line 37, change "rats" to --Rats--.

Column 12, line 38, change "column" to --Column--.

Column 12, line 39, change "column" to --Column--.

Column 12, line 43, change "Table" to --TABLE--.

UNITED STATES PATENT OFFICE
CERTIFICATE OF CORRECTION

Patent No. 3,719,182　　　　　　　Dated March 6, 1973

Inventor(s) Samuel Rose

It is certified that error appears in the above-identified patent and that said Letters Patent are hereby corrected as shown below:

In column 13, TABLE III under "Days after repeated antigen administration", "0" should be --$0^1$--.

In column 13, below TABLE III "1　= D y before immunization." should read --$^1$ Day 0 = Day before immunization.--

Column 17, line 50 change "Graphs" to --GRAPHS--.

Column 17, line 52 change "Graph" to --GRAPH--.

Claim 17, the first line should read --The process of claim 15 wherein the specific anti- --.

Claim 19, line 4, change "anti-$F_c$," to --anti-Fc,--.

Claim 19, line 5, change "anti-$F_c$" to --anti-Fc--.

Signed and sealed this 29th day of October 1974.

(SEAL)
Attest:

McCOY M. GIBSON JR.　　　　　　　C. MARSHALL DANN
Attesting Officer　　　　　　　　Commissioner of Patents